United States Patent [19]

Richerson

[11] Patent Number: 4,973,341

[45] Date of Patent: * Nov. 27, 1990

[54] CYCLONIC SEPARATOR FOR REMOVING AND RECOVERING AIRBORNE PARTICLES

[76] Inventor: Ben M. Richerson, H.C. 66, Box 133, Overbrook, Okla. 73453

[*] Notice: The portion of the term of this patent subsequent to May 22, 2007 has been disclaimed.

[21] Appl. No.: 427,018

[22] Filed: Oct. 25, 1989

Related U.S. Application Data

[63] Continuation of Ser. No. 313,078, Feb. 21, 1989, Pat. No. 4,927,437.

[51] Int. Cl.$^5$ .............................................. B03C 3/00
[52] U.S. Cl. ....................................... 55/127; 55/461
[58] Field of Search .................... 55/461, 127; 209/144

[56] References Cited

U.S. PATENT DOCUMENTS

| | | | |
|---|---|---|---|
| 499,799 | 6/1893 | Parkinson | 55/430 |
| 768,415 | 8/1904 | Wingrove | 55/444 |
| 1,362,251 | 12/1920 | Kellogg | 55/461 |
| 1,772,037 | 8/1930 | Bradshaw | 122/491 |
| 2,139,736 | 12/1938 | Durham | 55/127 |
| 2,546,246 | 3/1951 | Whiton et al. | 55/459.3 |
| 3,077,714 | 2/1963 | McIlvaine | 55/238 |
| 3,140,937 | 7/1964 | Hoffstrom | 55/459.3 |
| 3,236,031 | 2/1966 | Bennett et al. | 55/238 |
| 3,890,124 | 6/1975 | Howes | 55/346 |
| 4,061,478 | 12/1977 | Hartwick | 55/257 PV |
| 4,239,513 | 12/1980 | Paul et al. | 55/118 |
| 4,321,064 | 3/1982 | Vargo | 55/1 |
| 4,328,012 | 5/1982 | Telchuk et al. | 55/90 |
| 4,483,698 | 11/1984 | Kuchenthal et al. | 55/238 |
| 4,515,073 | 5/1985 | Dorsch et al. | 98/115.2 |
| 4,608,064 | 8/1986 | Napadow | 55/238 |
| 4,704,905 | 11/1987 | Johnson et al. | 98/115.2 |

FOREIGN PATENT DOCUMENTS

231156 4/1923 Fed. Rep. of Germany.
1122498 6/1962 Fed. Rep. of Germany.

OTHER PUBLICATIONS

John L. Alden and John M. Kane, Design of Industrial Ventilation Systems, Fifth Edition, 1982; pp. 142–146.

Primary Examiner—Bernard Nozick
Attorney, Agent, or Firm—Johnson & Gibbs

[57] ABSTRACT

A cyclonic separator for particles suspended in the flow of an air stream. The separator comprises first and second spiral baffles adapted for mating engagement one within the other for imparting cyclonic flow to the air stream for collecting the particles from cyclonic motion thereof. The baffles are oriented with the first baffle rotated relative to the second baffle to therein form a flow path therebetween. The flow path between the baffles has in it a reversing, oppositely directed concentric spiral passage which carries the particles in a first spiral direction and then in a second opposite spiral direction. Each inner terminal end of the first baffle, or each outer terminal end of the second baffle, or both, may include an arcuate region of sharply increasing curvature adapted for collecting strayed paint particles and solvent droplets. The first and the second spiral baffles as described above may also be made from electrically conductive material and each is being held electrically insulated from the other for the application of electric potentials of opposite polarity thereto.

35 Claims, 2 Drawing Sheets

CYCLONIC SEPARATOR FOR REMOVING AND RECOVERING AIRBORNE PARTICLES

The present application is a continuation of U.S. Pat. application Ser. No. 07/313,078 filed Feb. 21, 1989 now U.S. No. Pat. 4927437.

BACKGROUND OF THE INVENTION

This invention relates to cyclonic separator device for removing airborne particles, including solid and liquid, from contaminated air stream and, more particularly, to a novel apparatus for removing and recovering paint particles and solvents from the exhaust air.

There are three basic spray application techniques. The first one is air atomization where the coating particles are mixed with air stream ejected from the spray gun to the product to be coated. The second technique is airless atomization wherein the coating material is atomized and propelled by a hydraulic pressure. The third technique is electrostatic spraying wherein the coating material is atomized either by air or airless technique and the coating materials are deposited on the product by electrical attraction. Regardless of the spray technique used, a spray booth is commonly employed to prevent the stray of solvents and paint particles to the environment and the exposure of workers to the solvents and paint particles.

Present day spray booths are designed to provide a safe working place and to prevent polluting the atmosphere. Further, the use of spray booths will enhance the quality of the product being sprayed. In spray booths, it is necessary to maintain a steady and even flow of air through the booths. Constant air flow keeps the airborne paint particles and solvents, both of them are often toxic, away from the workers so that they will not inhale nor be exposed to toxic substances. These are usually required by Occupational Safety and Health Administration as well as by insurance carriers. The constant air flow also prevents the object that is being painted from forming drips or uneven finish. Moreover, environmental clean air standards require that the emissions from spray booths must not exceed a certain amount of particulates and solvents. Thus, the use of spray booths are usually required by the federal or state regulatory agencies, in particular, the Environmental Protection Agency.

To remove paint particulates and solvents from air exhausted from a spray booth, the common practice is to employ a replaceable fibrous filter which will trap the majority of the particulates and some of the solvent. These filters soon become clogged with sprayed particulates and require replacement. When the filters are clogged, the air flow through the booth is substantially reduced, thus decreasing the air flow past the worker inside the booth. Further, the air cleaning ability of the spray booth is greatly reduced and productivity is decreased because the system must be shut down to replace the filters. Moreover, these replaceable fibrous filters are expensive.

In U.S. Pat. No. 499,799 issued to Parkinson and Parkinson, a dust collector is disclosed. It is to be used in the treatment of grain where an air blast is employed for carrying off from the grain the dust. The device utilizes a series of chambers and passageways. Air accelerates through the passageways defined by S-shaped plates arranged in vertical rows, then the air becomes relatively dormant in the chamber allowing relatively heavy solid particles to drop out.

U.S. Pat. No. 768,415 issued to Wingrove discloses an oil interceptor to be used in ice making machines. The device has large surface of baffle-plate on which the ammonia gas and oil discharged from the compressor will strike. The oil will deposit on the surface and drain downward. The baffle-plate has a shape approximating a letter S, except instead of having a curved formation, the parts are angular.

U.S. Pat. No. 1,772,037 issued to Bradshaw teaches a fluid separator for separating the moisture and other impurities from the steam. The device uses the centrifugal effect on the flowing moisture so as to throw the liquid out of the current of gas against the baffles. The baffles increase in curvature as the inner or outlet ends are approached to enhance centrifugal effect. The baffles of the second annular row are curved in a direction opposite to the curvature of the baffles of the first annular row. The device also uses a plurality of complete stages of centrifugal separators.

In U.S. Pat. No. 3,077,714 issued to McIlvaine, a gas cleaner is taught. The device is a separator which causes intimate contact between the gas and the scrubbing liquid. The contaminant particles are entrapped in the liquid droplets which are then spun to form a film on the surface of a plate and discharged.

U.S. Pat. No. 3,236,031 issued to Bennett et al. teaches a wet dust separator. The device promotes the contact of whirling gas with a liquid so that dust particles thrown outwardly by the whirling action of the gas are entrapped by the liquid and removed from the gas along with the removal of the liquid.

U.S. Pat. No. 3,890,124 issued to Howes discloses a combination grease centrifugal separator and flame trap. The device is a box-like structure to be secured in the exhaust hood of a cooking range which extracts grease from the cooking fumes as they pass through the filter and prevents further propagation of any attendant flame at the filter. The grease and other exhaust particles are precipitated on the inner surfaces of the semicircular filter.

U.S. Pat. No. 4,061,478 issued to Hartwick discloses a self-cleaning smoke filter. The filter includes a channel with multiple longitudinal sides angularly disposed, an inlet port for receiving contaminated gaseous emissions, and an outlet port. The filter also contains spraying means for producing a cleansing spray inside the channel.

U.S. Pat. No. 4,239,513 issued to Paul teaches a separator device for separating out foreign particulates from a gas flow. The device uses wall plates to deflect a gas flow and to subject the same to centrifugal force so that the foreign particulates are collected on the wall plates. The device contains spirally curved S-shaped laminae to define passageways, at least a part of which has a cross-section which first narrows and then widens in the direction of fluid flow and which is also curved spirally first in one and then in the opposite direction. Nozzle means are arranged to feed moisture into the fluid flow to assist wet separation. The device relies on, firstly, narrowing acceleration paths; secondly, the introduction of water; and, lastly, reversal of flow to form a secondary vortex and pull a film of fluid back into air suspension to mix with the solids and again be deposited on the wall plates as gas travels through the exit passage.

U.S. Pat. No. 4,321,064 issued to Vargo teaches a filter apparatus for separating suspended particles from a fluid. The filter contains a flat sheet, a corrugated sheet adhered to the flat sheet, a first array of parallelly spaced orifices formed in the flat sheet, and a second array of parallelly spaced orifices formed in the sheet. The orifices in the first array are disposed laterally in spaced relationship from orifices in the second array. Further, orifices in the first array communicate with orifices in the second array through corrugation in the corrugated sheet.

In U.S. Pat. No. 4,328,012 issued to Telchuk, Jr. et al., an air washer/scrubber is disclosed. The device flows opposed sheets of water over a subfloor of a paint spray booth down the steeply inclined walls of a shallow, V-shaped slot, and against upturned ledges along the inner edges of the slot walls. These ledges kick the water from each of the opposed slot walls upwardly and inwardly to from a curtain of water to cover the slot opening. When the paint-laden air is pulled into the slot and accelerated through this curtain of water, the air and water are intermixed and, consequently, removes the paint particles.

U.S. Pat. No. 4,483,698 issued to Kuchenthal et al. teaches an apparatus for paint mist removal. This device vigorously mixes the exhaust air with the washing liquid whereby the paint particles are absorbed onto washing liquid droplets which can be removed.

U.S. Pat. No. 4,515,073 issued to Dorsch et al. discloses an air scrubbing system. The apparatus includes a sub-floor flooded with a flowing scrubbing fluid and a scrubbing fluid spray source with conduit means having baffles that cause the air and the fluid spray to flow in a direction-reversing serpentine path. The contaminated air passes through the scrubbing fluid multiple of times so that the particulate matter can be removed.

U.S. Pat. No. 4,608,064 issued to Napadow teaches a multi-wash spray booth. The device uses a multiple of water washes in the air cleaning section of the spray booth.

U.S. Pat. No. 4,704,952 issued to Johnson et al. discloses an apparatus for applying paint. The invention is directed to a wet scrubber for use in a downdraft type paint spray booth in which the air leaving the lower ends of the outlet structures in the wetted subfloor is caused to undergo a sharp directional change, thereby throwing off water in the immediate vicinity of the scrubber discharge. The paint-laden water is collected and directed to a treatment facility.

German Patent Description No. 1,122,498 teaches a device for the separation of finely distributed liquid out of a gaseous transportation medium. The transportation medium is partitioned into thin layers by a number of horizontally positioned chambers which run parallel to one another, formed by guide tin plates and bypassed twice by about 180°. The device provides for the guidance sheet metal plates being concavely bent against one another in both bypass areas, so that these plates form a widening and again tapering path of turbulence.

Emission standards are set very high today. While some prior art devices may suggest various techniques, such as spraying water in a spray booth to trap the paint particulates and solvents, they often do not meet today's rigorous requirements. Consequently, many of the spray booths which were designed earlier no longer can meet the new rigorous emission standards. Further, prior art devices are not well suited for collecting stray paints and solvents for re-use.

Accordingly, there is a need for an filter or baffle system that does not have to be replaced often and that will efficiently remove airborne particles, including solid and liquid, from exhaust air so that the air emitted to the atmosphere will not pollute the surrounding areas. Moreover, there is a need to recover for re-use strayed paints and solvents.

SUMMARY OF THE INVENTION

The present invention pertains to cyclonic separators. More particularly, one aspect of the invention includes a cyclonic separator for particles suspended in a flow of air stream. The separator comprises first and second spiral baffles adapted for mating engagement one within the other for imparting cyclonic flow to the air stream for collecting the particles from cyclonic motion thereon. The baffles are oriented with the first baffle rotated relative to the second baffle to therein comprise a flow path therebetween. The flow path between the baffles has in it a reversing, oppositely directed concentric spiral passage which carries the particles in a first spiral direction and then in a second opposite spiral direction.

In yet another aspect, the invention includes the above described apparatus wherein the first and second baffles are each constructed of a spiral shape comprising at least approximately 630° of curvature. Each of the baffles is also curved first through about 180° of deflection with increasing curvature and then continuing through about 450° with decreasing curvature. The inner terminal end of the first baffle includes an arcuate region of sharply increasing curvature adapted for collecting particles thereon following the termination of the flow of air stream from a first direction prior to its reversal and flow in a second opposite direction.

In still another aspect, the first and the second spiral baffles as described above are made from electrically conductive material and each is being held electrically insulated from the other for the application of electric potentials of opposite polarity thereto.

It is thus the general object of the present invention to provide a new and improved filter or baffle system that will efficiently remove airborne particles, including solid particulates and liquid droplets, from exhaust air.

Another object of this invention is to provide a new and improved filter or baffle system that will efficiently remove paint particulates and solvents from exhaust air in a paint booth.

A further object of this invention is to provide a new and improved filter or baffle system that will efficiently recover paint particulates and solvents from exhaust air in a paint booth.

Another further object of this invention is to provide a new and improved filter or baffle system that will efficiently remove paint particulates and solvents from exhaust air in a paint booth yet allowing large volumes of air to pass through with a minimal loss of efficiency.

A still further object of this invention is to provide a new and improved filter or baffle system that will efficiently trap paint particulates and solvents from exhaust air in a paint booth so that the exhaust air emitted to the atmosphere will not pollute the surroundings.

Yet another object of this invention is provide a new and improved filter or baffle system that will efficiently remove airborne paint particulates and solvents from exhaust air in a paint booth and that the filter or baffle system does not have to be replaced often.

Still another object of this invention is to provide a new and improved filter or baffle system that will efficiently remove airborne paint particulates and solvents form exhaust air in a paint booth and the filter or baffle system can be adapted to accommodate various sizes of paint booths.

BRIEF DESCRIPTION OF THE DRAWINGS

For a more complete understanding of the present invention and for further objects and advantages thereof, reference may now be had to the following description taken in conjunction with the accompanying drawings in which.

DETAILED DESCRIPTION

Figure 1:
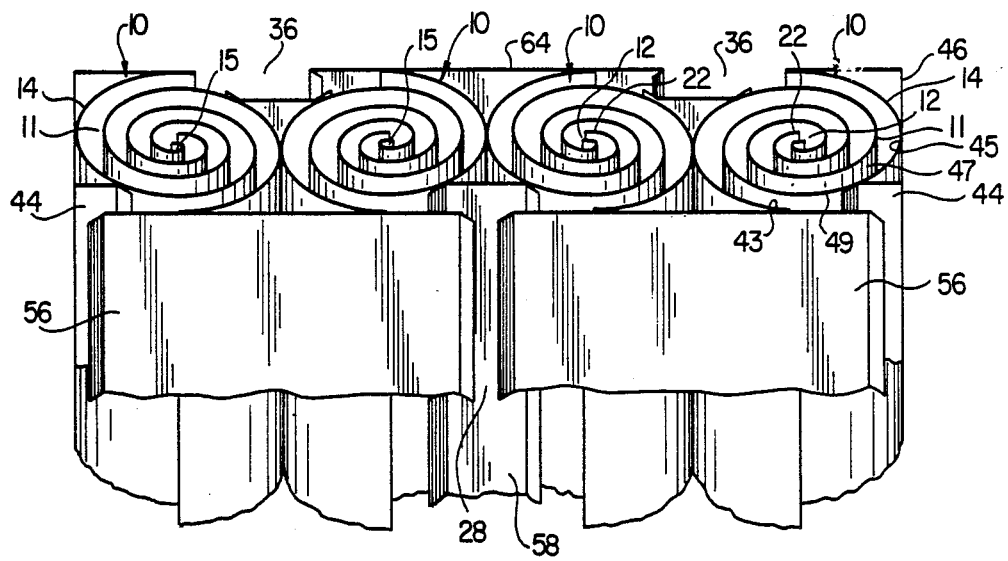
FIG. 1 is a diagrammatic, perspective view of one embodiment of the apparatus of the present invention.

Referring first to FIG. 1, there is shown a diagrammatic, perspective view of the apparatus, the cyclonic separator, constructed according in accordance with the principles of the present invention. The unit as shown consists of four sets or assemblies of laminae, 10. Each set of laminae consists of two spiral baffles: a first baffle, 11, and a second baffle, 14. The first and the second baffles can be similar in shape, but they differ in their orientation. Both baffles are substantially equivalent in size and are adapted for imparting a cyclonic flow to the air stream contaminated with airborne particles, such as paint particles and solvent droplets. The inner surface 43 of the first baffle 11, together with the outer surface 49 of the second baffle 14, channel and direct the inward flow of air stream. The inner surface 45 of the second baffle 14, together with the outer surface 47 of the first baffle 11, channel and direct the discharge of the air stream. Both baffles are each constructed of a spiral shape comprising approximately 720. of curvature. Extending inwardly from the external end, 13 or 23, each baffle is curved first through about 180. of deflection with increasing curvature and then continuing through about 540. of deflection with decreasing curvature. The baffles are being disposed one within the other and oriented so that the first baffle, 11, rotates approximately 180. from the second baffle, 14. Consequently, a flow path for cyclonic motion is created between the two baffles. The flow path defined between the two baffles comprises a reversing, oppositely directed, concentric spiral passage whereby the flow of contaminated air stream in a first direction is reversed following cyclonic motion into a second and opposite direction. In this embodiment, the inner terminal end 12 of the first baffle 11 includes an arcuate region of sharply increasing curvature adapted for collecting particles thereon following the termination of the flow of the air stream from a first direction prior to its reversal and flow in the second opposite direction.

Still referring to FIG. 1, an exhaust throat 62 and an ingress plate 56 help to hold the two adjacent "terminal" sets of laminae in place. The ingress throat 58 and the exhaust plate 64 help to steady the two "central" sets of laminae. These throats and plates also function as deflector or collector of airborne particles. Moreover, each side of the device is provided with enclosure frame 46 and side deflection plate 44.

For ease of construction and convenience, the laminae has a height of about 42 inches. With the exception of the width of the passageway, or path, formed near the internal terminal 22 of the second baffle 14 and near the internal terminal 12 of the first baffle 11 (around chamber 42), the remaining passageway formed by the two baffles has a substantially equal width. Again, for ease of construction and convenience, the width of this substantially uniform passageway is approximate one inch. Thus, with four sets of adjacent laminae as shown in FIG. 1, the end-to-end measurement would be approximately 28 to 30 inches wide. In a paint booth, sets of laminae can be stack one on top of another to achieve the desired height of the paint booth. Likewise, sets of laminae can be arranged horizontally one adjacent to another to achieve the desired width of the paint booth.

The baffles may be made from sheet metal or plastic material or a sheet metal coated with plastics material.

Figure 2:
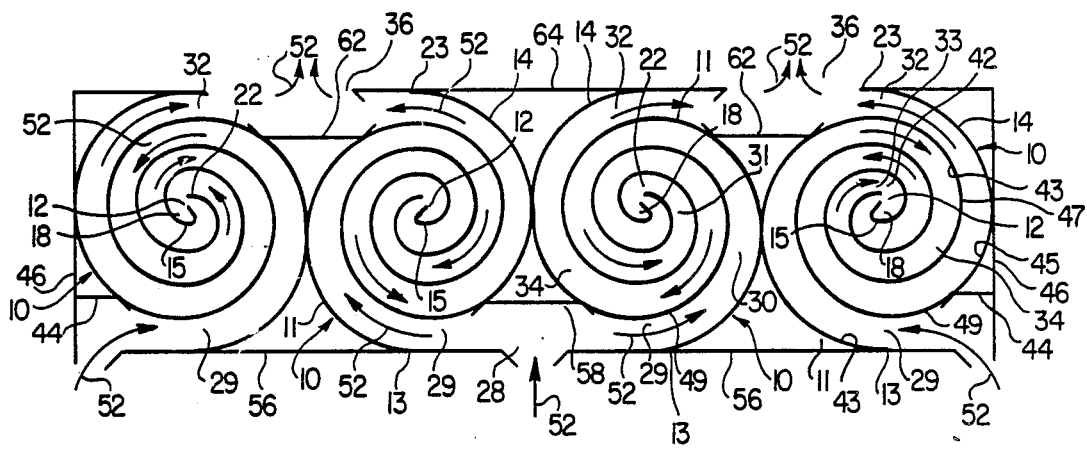
FIG. 2 is a top plan, cross-sectional view of the apparatus of FIG. 1.

Referring now to FIG. 2 in which it is shown a top plan, cross-sectional view of the apparatus depicted in FIG. 1. Arrows 52 indicate the flow of air stream carrying particulates to be separated by the baffles. The width of inlet passageway 29, the width of passageways 30, 31 and 34, and the width of exhaust passageway 32 are substantially equal in this embodiment. Most of the heavy particulates, or particles, in the air stream are thrown out and trapped on, or adhered to, the wall of the baffles when the air stream is subjected to centrifugal effect created by the cyclonic flow of air stream near the points of inlet 28. In chamber 42, the flow of the air stream is reversed from a first direction before flowing in the second opposite direction. Each of the inner terminal end 12 of each of the first baffle 11 includes an arcuate region of sharply increasing curvature adapted for collecting particles thereon following the termination of the flow of the air stream from a first direction prior to its reversal and flow in the second opposite direction. It is in this region where most of the fine mist and light particles are thrown out and trapped by, or adhered to, the wall of the baffle. A short section 15 near the inner terminal end 12 of the first baffle 11 is substantially parallel to ingress plate 56. The arcuate or concave region 18 formed near the inner terminal end 12 of the first baffle 11 will further assist in collecting particulates which are already trapped on, or adhered to, the surface of the curved baffles but are now blown or carried by the rapidly flowing air stream to this region.

Still referring to FIG. 2, before the flow of air stream contaminated with airborne particulates, as designated by arrows 52, is introduced into the interior of laminae, there is a large surface area of curved baffles designed to capture and trap a maximum amount of airborne particulates. The air stream enters the laminae at approximately 90° angle to the curved surface of baffles. However, the throat, or inlet, 29 to the laminae is relatively narrow, thus, the air flow is "snapped" both in velocity and in direction. A large quantity of heavy particles will be deposited on the curved surface near this point. The smaller and lighter particles, however, will remain in the air flow and travel through the passageway 30. From this point on, air stream, still contaminated with some airborne particles, will travel at a relatively uniform speed through a spiral of decreasing curvature or radius. The centrifugal force on the particles, however, will increase and, hence, they will move further to the outside of the curvature or radius until deposited on the wall or the deflection surface. Most of the particles captured will run down the wall or surface into collection trough (not shown in the diagram) and can be recycled for re-use. Some of the particles will be blown along the wall or curved surface to the inner region of the spiral baffle. Around region 33, flow of air stream is reversed and a low pressure is created around the arcuate, concave, or cuplike, region 18. Remaining airborne particles will be collected on the wall here and will run down into the collection troughs. The exhaust, or exit, passageway 32 serves as a means of discharging air on the opposite side of the baffles through exit 36. Before discharge, however, the air stream is still traveling in a circular direction, though with decreasing centrifugal force. As shown later, if desired, an additional arcuate or concave region can be added at the outer or exit terminal 23 of the second baffle 14 to further insure that all airborne particles are trapped before the air stream is discharged to the atmosphere through outlet or exit 36.

Figures 3, 4:
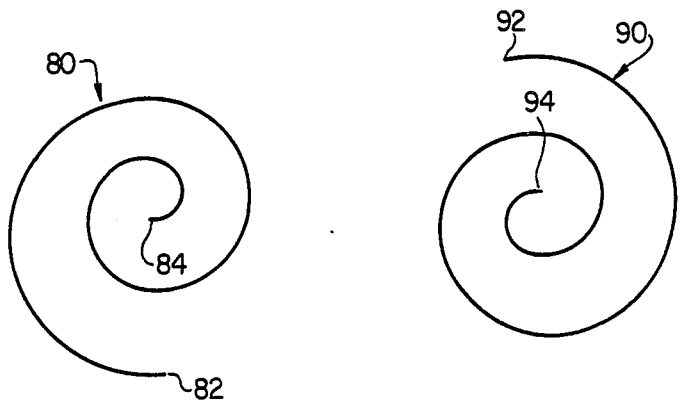
FIG. 3 is a top plan, cross-sectional view of one of the spiral baffles, the first baffle, comprising approximately 720. of curvature.
FIG. 4 is a top plan, cross-sectional view of one of the spiral baffles, the second baffle, comprising approximately 720. of curvature.

FIG. 3 shows a top plan, cross-sectional view of one of the spiral baffles, the first baffle 80. It is shown that extending inwardly from the outer terminal 82, baffle 80 is first curved through about 180° of deflection in a single spiral, circular and clockwise direction with increasing curvature and then continuing through about 540° of deflection with decreasing curvature, ending at the inner terminal 84.

FIG. 4 shows a top plan, cross-sectional view of one the spiral baffles, the second baffle 90. The figure shows that extending inwardly from the outer terminal 92, baffle 90 first curved through about 180° of deflection in a single spiral, circular and clockwise direction with increasing curvature and then continuing through about 540° of deflection with decreasing curvature, ending at the inner terminal 94.

Figure 5:
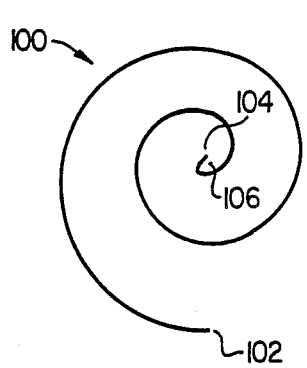
FIG. 5 is a top plan, cross-sectional view of one of the spiral baffles, the first baffle, comprising approximately 720. of curvature containing an arcuate region of sharply increasing curvature at the inner terminal end.

Referring now to FIG. 5, it is shown a top plan, cross-sectional view of another embodiment of the spirally curved first baffle 100. The baffle shown in this figure is similar in some respects to the first baffle 80 shown in FIG. 3. Extending inwardly from the outer terminal 102, baffle 100 is first curved through about 180° of deflection in a single spiral, circular and clockwise direction with increasing curvature and then continuing through about 540° of deflection with decreasing curvature. The inner terminal 104 is curved sharply with increasing curvature to form an arcuate, or concave, region 106.

Figure 6:
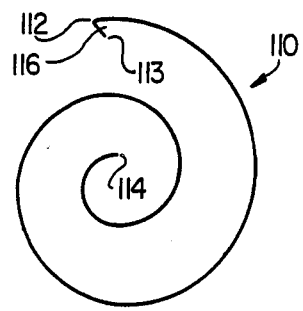
FIG. 6 is a top plan, cross-sectional view of one of the spiral baffles, the second baffle, comprising approximately 720. of curvature containing an arcuate region of sharply increasing curvature at the outer terminal end.

Referring now to FIG. 6, it is shown the top plan, cross-sectional view of another embodiment of a second baffle 110 that is curled spirally. The baffle shown in this figure is similar in many respects to the second baffle 90 shown in FIG. 4. Extending inwardly from the outer, or external, terminal point 112, baffle 110 is first curved through about 180° of deflection in a single spiral, circular and clockwise direction with increasing curvature and then continuing through about 540° of deflection with decreasing curvature, ending with the inner terminal 114. The external terminal 112 is curved sharply with increasing curvature to end at 113, forming an arcuate, or concave, region 116.

Figure 7:
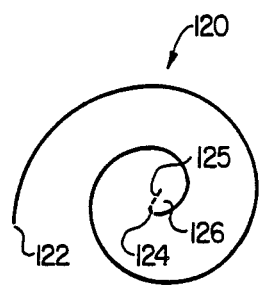
FIG. 7 is a top plan, cross-sectional view of one of the spiral baffles, the first baffle, comprising approximately 630. of curvature, and an optional arcuate region of sharply increasing curvature at the inner terminal end as indicated by dotted line.

Referring now to FIG. 7, it is shown a top plan, cross-sectional view of yet another alternate spiral baffle, the first baffle, 120. It is shown that extending inwardly from the outer terminal 122, first baffle 120 is first curved through about 180° of deflection in a single spiral, circular, and clockwise direction with increasing curvature and then continuing through about 450° of deflection with decreasing curvature, ending at the inner terminal 124. Dotted line in the diagram shows an optional arcuate, or concave, region 126 that can be formed by sharply increasing curvature at the inner terminal section 125. Although this embodiment shows a 630° of curvature, additional spiral loop or curvature can be employed. For example, multiples of 630° of curvature can be employed to achieve the desired result.

Figure 8:
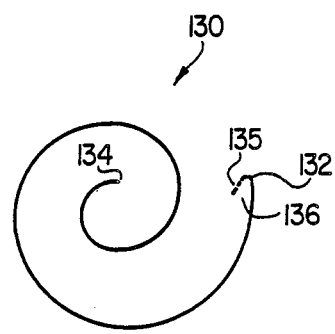
FIG. 8 is a top plan, cross-sectional view of one of the spiral baffles, the second baffle, comprising approximately 630. of curvature, and an optional arcuate region of sharply increasing curvature at the outer terminal end as indicated by dotted line.

Referring now to FIG. 8, it is shown a top plan, cross-sectional view of yet another alternate second spiral baffle 130. It is shown that extending inwardly from the outer terminal 132, second baffle 130 is first curved through about 180° of deflection in a single spiral, circular and clockwise direction with increasing curvature and then continuing through about 450° of deflection with decreasing curvature, ending at the inner terminal 134. Dotted line in the diagram shows an optional arcuate, or concave, region 136 that can be formed by sharply increasing curvature at the outer terminal section 135.

Figure 9:
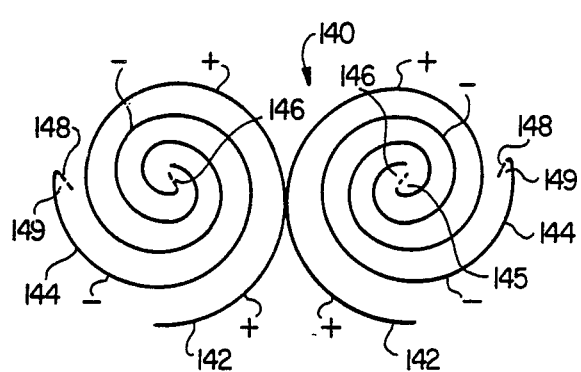
FIG. 9 is a top plan, cross-sectional view of two sets of laminae, each set consists of two spiral baffles.

Referring now to FIG. 9, it is shown the top plan, cross-sectional view of two sets or assemblies of laminae each consisting of a first spiral baffle 142 and a second spiral baffle 144. In each set of laminae, the two baffles are adapted for mating engagement one within the other for imparting cyclonic flow to the air stream contaminated with airborne particles for collecting those particles from cyclonic motion thereon. The two baffles, 142 and 144, in each set of laminae are oriented so that the first baffle 142 is rotated relative to the second baffle 144 to comprise therein a flow path for the cyclonic motion therebetween. The flow path defined between the baffles comprises a reversing, oppositely directed, concentric spiral passage whereby the air stream in a first direction is reversed following cyclonic motion into a second, opposite direction. In this alternate embodiment, each baffle in each set of laminae is constructed of a spiral shape of about 720° of curvature. Further, an optional arcuate, or concave, region 145 can be formed at the inner terminal end of the first baffle 142, as shown by dotted line 146. Here is where the flow of air stream terminates from a first direction prior to its reversal and flow in the second opposite direction. Similarly, another optional arcuate, or concave, region 149 can be formed at the outer terminal end of the second baffle 144 by sharply curving the end terminal, as shown by dotted line 148. Here is where the air stream is about to be, and before being, discharge to the atmosphere or the surroundings. In another embodiment, each baffle may be alternately electrically insulated from one another, so that differential voltages, as shown by the "+" symbols for the first baffle 142 and "−" symbols for the second baffle 144 may be applied thereto. Thus, the function of an electrostatic precipitator can be obtained and used for the purpose of separating charged airborne particles. Alternatively, since each baffle may be grounded, it will also attract paint particles that are positively charged.

Figure 10:
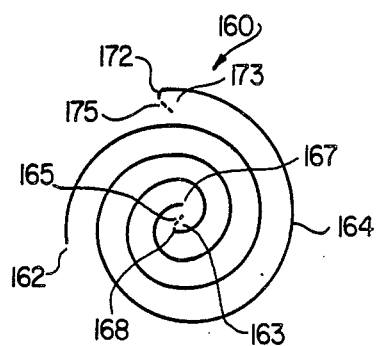
FIG. 10 is a top plan, cross-sectional view of one set of laminae consisting of two spiral baffles.

Referring to FIG. 10, in which it is shown a top plan, cross-sectional view of yet an alternate embodiment of one set or assembly of laminae 160 consisting of two spiral baffles, the first baffle 162 and the second baffle 164. In this embodiment, the first baffle 162 has a spiral shape comprising approximately 630° of curvature. Extending inwardly from outer terminal 162, it is first curved through about 180° of deflection in a clockwise direction with increasing curvature and then continuing through about 450° of deflection with decreasing curvature, ending at inner terminal 168. Further, an optional arcuate, or concave, region 163 can be formed at the inner terminal end of the first baffle 162 by sharply curving the end, as shown by dotted line 165. The second baffle 164 has a spiral shape comprising approximately 720° of curvature. Extending inwardly from outer terminal 172, this second baffle 164 is first curved through about 180° of deflection in a clockwise direction with increasing curvature and then continuing through about 540° of deflection with decreasing curvature, ending at inner terminal 167. Similarly, another optional arcuate, or concave, region 173 can be formed at the outer terminal end of the second baffle 164, as shown by dotted line 175.

It is thus believed that the operation and construction of the present invention will be apparent from the foregoing description. While the method and apparatus shown and described have been characterized as being preferred, it will be obvious that various changes and modifications may be made therein without departing from the spirit and scope of the invention as defined in the following claims.

I claim:

1. A cyclonic separator for removing particles from an air stream entering said separator, said separator comprising:
    first and second baffles, each spiralling in a single circular direction, adapted for mating engagement each one within the other in a substantially concentric manner for imparting a cyclonic flow to said air stream; and
    said first baffle being disposed in an opposite direction of inwardly extending curvature relative to said second baffle to define a flow path with a concentric and spiral inlet passageway and a concentric and spiral outlet passageway, said inlet passageway having a substantially uniform width to provide said cyclonic flow of said air stream therebetween whereby said air stream flowing with cyclonic motion in a first direction is reversed to flow with cyclonic motion in a second, opposite direction.

2. The apparatus as set forth in claim 1 and further including spacer means for holding said baffles in defined positions one to the other.

3. The apparatus as set forth in claim 1 wherein the inner terminal end of said first baffle includes an arcuate region of sharply increasing curvature adapted for collecting particles thereon following the termination of the flow of said air stream from a first direction prior to its reversal and flow in said second opposite direction.

4. The apparatus as set forth in claim 1 wherein the outer terminal end of said second baffle includes an arcuate region of sharply increasing curvature adapted for collecting particles thereon prior to the discharge of said air stream.

5. The apparatus as set forth in claim 1 wherein both the inner terminal end of said first baffle and the outer terminal end of said second baffle include arcuate regions of sharply increasing curvature adapted for collecting particles from the flow of said air stream.

6. The apparatus as set forth in claim 1 wherein a plurality of oppositely disposed spiral baffles assemblies are disposed adjacent one another for defining a region of said air stream ingression and an opposite region of said air stream exhaust.

7. A cyclonic separator for removing particles from an air stream entering said separator, said separator comprising:
    first and second baffles, each spiralling in a single circular direction, with substantially equivalent size adapted for imparting cyclonic flow to said air stream;
    said baffles being disposed one within the other in a substantially concentric manner and oriented such that said first baffle is rotated approximately 180° from said second baffle to therein comprise a flow path with a concentric and spiral inlet passageway and a concentric and spiral outlet passageway, said inlet passageway having a substantially uniform width to provide cyclonic flow of said air stream therebetween whereby said air stream flowing with cyclonic motion in a first direction is reversed to flow with cyclonic motion in a second, opposite direction; and
    the inner terminal end of said first baffle includes an arcuate region of sharply increasing curvature adapted for collecting particles thereon at a location near the point of reversal of the flow of said air stream from the first direction to its flow in the second opposite direction.

8. The apparatus as set forth in claim 7 and further including spacer means for holding said baffles in defined positions one to the other.

9. The apparatus as set forth in claim 7 wherein the outer terminal end of said second baffle includes an arcuate region of sharply increasing curvature adapted for collecting particles thereon prior to the discharge of said air stream.

10. The apparatus as set forth in claim 7 wherein a plurality of oppositely disposed spiral baffles assemblies are disposed adjacent one another for defining a region of said air stream ingression and an opposite region of said air stream exhaust.

11. A cyclonic separator for removing particles from an air stream entering said separator, said separator comprising:
    first and second baffles, each spiralling in a single circular direction, with substantially equivalent size adapted for imparting a cyclonic flow to said air stream;

said baffles being disposed one within the other in a substantially concentric manner and oriented such that said first baffle is rotated approximately 180° from said second baffle to define a flow path with a concentric and spiral inlet passageway and a concentric and spiral outlet passageway, said inlet passageway having a substantially uniform width to provide said cyclonic flow of said air stream therebetween whereby said air stream flowing with cyclonic motion in a first direction is reversed to flow with cyclonic motion in a second, opposite direction; and the outer terminal end of said second baffle includes an arcuate region of sharply increasing curvature adapted for collecting particles thereon prior to the discharge of said air stream.

12. The apparatus as set forth in claim 11 and further including spacer means for holding said baffles in defined positions one to the other.

13. The apparatus as set forth in claim 11 wherein the inner terminal end of said first baffle includes an arcuate region of sharply increasing curvature adapted for collecting particles thereon following the termination of the flow of said air stream from a first direction prior to its reversal and flow in said second opposite direction.

14. The apparatus as set forth in claim 11 wherein a plurality of oppositely disposed spiral baffles assemblies are disposed adjacent one another for defining a region of said air stream ingression and an opposite region of said air stream exhaust.

15. A cyclonic separator for removing particles from at least one air stream entering said separator, said separator comprising:

a first set of laminae comprising first and second baffles, each spiralling in a single circular direction, adapted for mating engagement each one within the other in a substantially concentric manner for imparting a first cyclonic flow to a first air stream, said first baffle in said first set of laminae being disposed in an opposite direction of inwardly extending curvature relative to said second baffle in said first set of laminae to define a first flow path with a first concentric and spiral inlet passageway and a concentric and spiral outlet passageway, said inlet passageway having a substantially uniform width to provide said first cyclonic flow of said first air stream therebetween whereby said first air stream flowing with cyclonic motion in a first direction is reversed to flow with cyclonic motion in a second, opposite direction;

a second set of laminae comprising first and second baffles, each spiralling in a single circular direction, adapted for mating engagement each one within the other in a substantially concentric manner for imparting a second cyclonic flow to a second air stream, said first baffle in said second set of laminae being disposed in an opposite direction of inwardly extending curvature relative to said second baffle in said second set of laminae to define a second flow path with a second concentric and spiral inlet passageway and a concentric and spiral outlet passageway, said inlet passageway having a substantially uniform width to provide said second cyclonic flow of said second air stream therebetween whereby said second air stream flowing with cyclonic motion in a first direction is reversed to flow with cyclonic motion in a second, opposite direction; and said first and second sets of laminae being disposed integrally adjacent one another for receiving said air flow therein.

16. The apparatus as set forth in claim 15 wherein said first set of laminae mirrored said second set of laminae.

17. The apparatus as set forth in claim 15 and further including spacer means for holding said baffles in defined positions one to the other.

18. The apparatus as set forth in claim 15, wherein the inner terminal end of said first baffle includes an arcuate region of sharply increasing curvature adapted for collecting particles thereon following the termination of the flow of said air stream from a first direction prior to its reversal and flow in said second opposite direction.

19. The apparatus as set forth in claim 15 wherein the outer terminal end of said second baffle includes an arcuate region of sharply increasing curvature adapted for collecting particles thereon prior to the discharge of said air stream.

20. The apparatus as set forth in claim 15 wherein both the inner terminal end of said first baffle and the outer terminal end of said second baffle in each said first set and said second set of laminae include arcuate regions of sharply increasing curvature adapted for collecting particles from the flow of said air stream.

21. The apparatus as set forth in claim 15 wherein a plurality of oppositely disposed sets of laminae are disposed adjacent one another for defining a region of said air stream ingression and an opposite region of said air stream exhaust.

22. A cyclonic separator for removing particles from at least one air stream entering said separator, said separator comprising:

a first set of laminae comprising first and second baffles, each spiralling in a single circular direction, with substantially equivalent size adapted for mating engagement each one within the other in a substantially concentric manner imparting a first cyclonic flow to a first air stream;

said first baffle in said first set of laminae being disposed in an opposite direction of inwardly extending curvature relative to said second baffle in said first set of laminae to define a first flow path with a first concentric and spiral inlet passageway and a concentric and spiral outlet passageway, said inlet passageway having a substantially uniform width to provide said first cyclonic flow of said first air stream therebetween whereby said first air stream flowing with cyclonic motion in a first direction is reversed to flow with cyclonic motion in a second, opposite direction;

the inner terminal end of said first baffle in said first set of laminae includes an arcuate region of sharply increasing curvature adapted for collecting particles thereon at a location near the point of reversal of the flow of said air stream from the first direction to its flow in the second opposite direction;

a second set of laminae comprising first and second baffles, each spiralling in a single circular direction, adapted for mating engagement each one within the other in a substantially concentric manner for imparting a second cyclonic flow to a second air stream, said first baffle in said second set of laminae being disposed in an opposite direction of inwardly extending curvature relative to said second baffle in said second set of laminae to define a second flow path with a second concentric and spiral inlet passageway and a concentric and spiral outlet passageway, said inlet passageway having a substantially uniform width to provide said second cyclonic flow of said second air stream therebetween whereby said second air stream flowing with cyclonic motion in a first direction is reversed to follow with cyclonic motion in a second, opposite direction;

the inner terminal end of said first baffle in said second set of laminae includes an arcuate region of sharply increasing curvature adapted for collecting particles thereon at a location near the point of reversal of the flow of said air stream from the first direction to its flow in the second opposite direction; and said first and second sets of laminae being disposed integrally adjacent one another for receiving said air flow therein.

23. The apparatus as set forth in claim 22 wherein said first set of laminae mirrored said second set of laminae.

24. The apparatus as set forth in claim 22 wherein a plurality of oppositely disposed sets of laminae are disposed adjacent one another for defining a region of said air stream ingression and an opposite region of said air stream exhaust.

25. A cyclonic separator for removing particles from an air stream entering said separator, said separator comprising:

first and second baffles, each spiralling in a single circular direction, adapted for mating engagement each one within the other in a substantially concentric manner for imparting a cyclonic flow to said air stream;

said first baffle being disposed in an opposite direction of inwardly extending curvature relative to said second baffle to define a flow path with a concentric and spiral inlet passageway and a concentric and spiral outlet passageway, said inlet passageway having a substantially uniform width to provide said cyclonic flow of said air stream therebetween whereby said air stream flowing with cyclonic motion in a first direction is reversed to flow with cyclonic motion in a second, opposite direction; and said baffles being made from electrically conductive material and each being held electrically insulated from the other for the application of electric potentials of opposite polarity thereto.

26. The apparatus as set forth in claim 25 wherein the outer terminal end of said second baffle includes an arcuate region of sharply increasing curvature adapted for collecting particles thereon prior to the discharge of said air stream.

27. The apparatus as set forth in claim 25 wherein both the inner terminal end of said first baffle and the outer terminal end of said second baffle include arcuate regions of sharply increasing curvature adapted for collecting particles from the flow of said air stream.

28. The apparatus as set forth in claim 25 wherein a plurality of oppositely disposed spiral baffles assemblies are disposed adjacent one another for defining a region of said air stream ingression and an opposite region of said air stream exhaust.

29. A cyclonic separator for removing particles from an air stream entering said separator, said separator comprising:

first and second baffles, each spiralling in a single circular direction, adapted for mating engagement each one within the other in a substantially concentric manner for imparting a cyclonic flow to said air stream;

said first baffle being disposed in an opposite direction of inwardly extending curvature relative to said second baffle to define a flow path with a concentric and spiral inlet passageway and a concentric and spiral outlet passageway, said inlet passageway having a substantially uniform width to provide said cyclonic flow of said air stream therebetween whereby said air stream flowing with cyclonic motion in a first direction is reversed to flow with cyclonic motion in a second, opposite direction;

said baffles being made from electrically conductive material and each being held electrically insulated from the other for the application of electric potentials of opposite polarity thereto; and the inner terminal end of said first baffle includes an arcuate region of sharply increasing curvature adapted for collecting particles thereon at a location near the point of reversal of the flow of said air stream from the first direction to its flow in the second opposite direction.

30. The apparatus as set forth in claim 29 wherein the outer terminal end of said second baffle includes an arcuate region of sharply increasing curvature adapted for collecting particles thereon prior to the discharge of said air stream.

31. The apparatus as set forth in claim 29 wherein a plurality of oppositely disposed spiral baffles assemblies are disposed adjacent one another for defining a region of said air stream ingression and an opposite region of said air stream exhaust.

32. A cyclonic separator for removing particulates from a gas stream entering said separator, said separator comprising:

a concentric, spiral inlet passageway having a substantially uniform width for guiding a gas stream entering said separator;

a concentric, spiral outlet passageway for guiding a gas stream leaving said separator;

said inlet and outlet passageways comprising a first and a second baffle, each one concentrically spiralling in a single circular direction and each one being concentrically disposed within the other in an opposite direction of inwardly extending curvature; and means for connecting said inlet and said outlet passageways for reversing the direction of flow of said gas stream.

33. The apparatus as set forth in claim 32 wherein said outlet passageway is of substantially uniform width.

34. The apparatus as set forth in claim 32 wherein said reversing means includes means for operatively connecting said inlet passageway and outlet passageway to allow gas flow therebetween.

35. The apparatus as set forth in claim 34 further comprises an arcuate region of sharply increasing curvature adapted for collecting particles thereon at a location near the point of reversing the direction of flow of said gas stream.

* * * * *

UNITED STATES PATENT AND TRADEMARK OFFICE
CERTIFICATE OF CORRECTION

PATENT NO. : 4,973,341
DATED : November 27, 1990
INVENTOR(S) : Ben M. Richerson

It is certified that error appears in the above-identified patent and that said Letters Patent is hereby corrected as shown below:

Column 3, line 6, insert --corrugated-- before "sheet";

Column 5, line 4, delete "form" and substitute --from--;

Column 5, line 20, delete "720." and substitute --720°--;

Column 5, line 23, delete "720." and substitute --720°--;

Column 5, line 26, delete "720." and substitute --720°--;

Column 5, line 30, delete "720." and substitute --720°--;

Column 5, line 34, delete "630." and substitute --630°--;

Column 5, line 39, delete "630." and substitute --630°--;

Column 5, line 67, delete "720." and substitute --720°--;

Column 6, line 1, delete "180." and substitute --180°--;

Column 6, line 2, delete "540." and substitute --540°--;

Column 6, line 5, delete "180." and substitute --180°--.

Signed and Sealed this

Sixteenth Day of March, 1993

Attest:

STEPHEN G. KUNIN

*Attesting Officer*  *Acting Commissioner of Patents and Trademarks*